Sept. 24, 1935.   E. R. STEIN   2,015,294
LID FOR BEER CRATES
Filed June 12, 1934
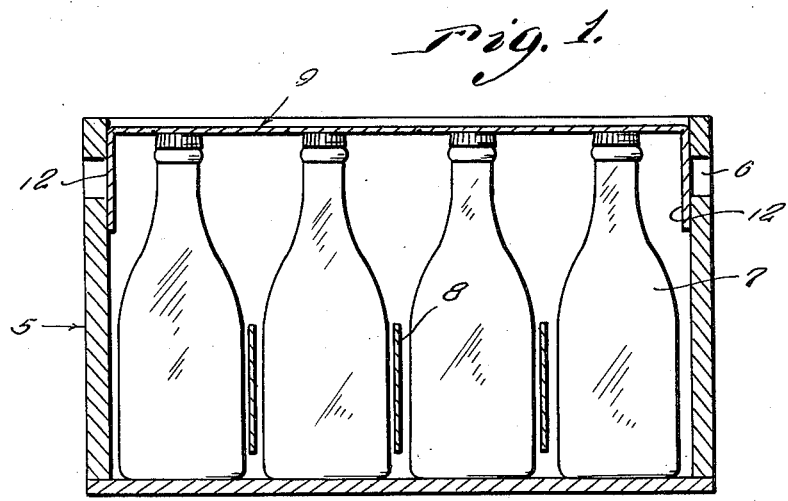
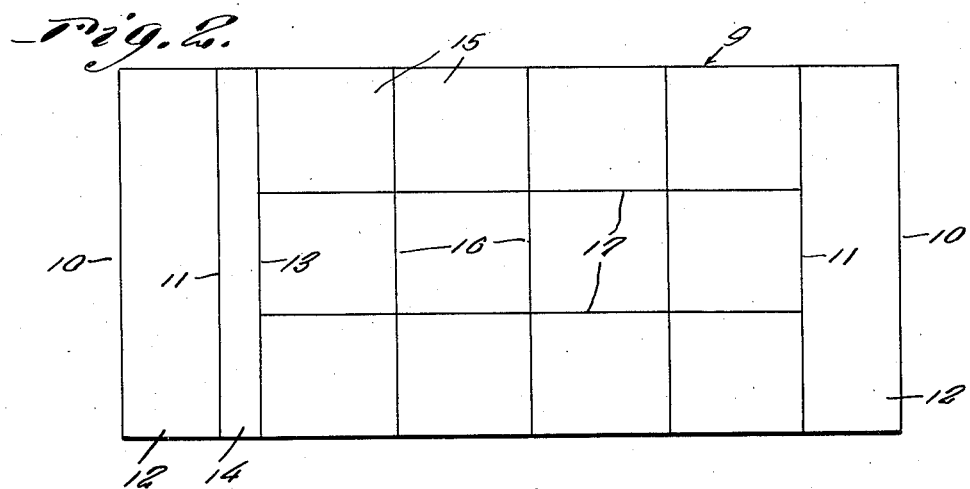
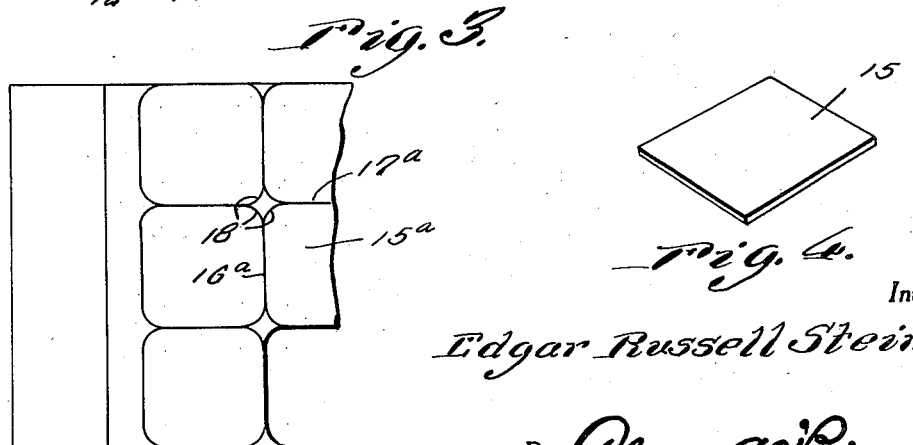
Inventor
Edgar Russell Stein
By Clarence A. O'Brien
Attorney Patented Sept. 24, 1935

2,015,294

UNITED STATES PATENT OFFICE 2,015,294

LID FOR BEER CRATES

Edgar Russell Stein, Martins Ferry, Ohio

Application June 12, 1934, Serial No. 730,327

1 Claim. (Cl. 217—56)

This invention relates to the class of wooden receptacles and more particularly to beer crates.

An object of the invention is to provide an improved lid for such crate; and the invention consists in the provision of a combination lid and beer mat.

Briefly stated the invention comprehends the provision of a lid for beer crate formed of mutually united sections capable of ready separation for use individually as beer mats.

It is a further object of the invention to provide a lid of the character above mentioned which will be found useful as an advertising medium and which will also reduce materially expenses on the part of breweries who at the present time, and in accordance with custom, supply the retailers with beer mats at a material cost to the brewery.

The invention together with its objects and advantages will be best understood from a study of the following description taken in connection with the accompanying drawing wherein:

Figure 1 is a sectional view through a beer crate illustrating the application of the invention.

Figure 2 is a plan view of the improved lid or closure.

Figure 3 is a fragmentary plan view of a slightly modified form of the invention, and Figure 4 is a perspective view of one of the beer mats as it appears when separated from the blank for use.

Referring to the drawing by reference numerals it will be seen that 5 indicates generally a beer crate having in the end walls thereof the apertures or slots 6 for accommodating the fingers to facilitate lifting and otherwise handling the crate. The contents of the crate, in this instance bottled beer are indicated by the reference numeral 7. In the present instance the crate 5 is also shown as provided with the usual partition 8.

The lid for the crate involving the features of the present invention is indicated generally by the reference numeral 9.

At the present time lids for beer crates are made of a ductile material and are practical for substantially no other useful purpose merely than as a lid. In accordance with the present invention however the lid 9 not only serves its intended function as a lid but is characterized by certain features of construction which enable the lid to be separated into a multiplicity of sections or parts each of which is adapted and designed to serve as a beer mat.

In each form of the invention the lid 9 is formed from a single blank of a suitable composition material having absorbent qualities. Preferably the lid 9 will consist of a single blank of beer mat stock, the blank being substantially rectangular in form and the dimensions of the blank dependent upon the dimensions of the case with which it is to be used.

In the form of the invention shown in Figure 2 the blank from which the lid 9 is formed is provided inwardly from the end edges 10 thereof with transverse score lines 11 paralleling the edges 10 whereby to provide flaps or folds 12 adapted to be folded on the lines 11 to extend downwardly in intimate contact with the inner faces of the end walls of the crate 5 and across the hand holes 6 for excluding light from the casing.

The body of the lid 9 inwardly from the fold line 11 adjacent one end of the lid is also provided with a transverse score line 13 paralleling the adjacent score line 11 and forming between the score line 13 and the adjacent score line 11 a space 14 that is adapted to have printed or otherwise formed thereon instructions as to the use of the lid and the manner in which the same can be used for providing individual beer mats.

The body of the lid 9 between the score line 13 and that score line 11 farthest remote from the line 13 is divided into a multiplicity of areas or sections 15 by intersecting transverse score lines 16 and longitudinal score lines 17. The sections 15 bounded by the score lines 16 and 17 are adapted for use as individual beer mats and can be readily separated from the main body of the lid along the lines 16 and 17. Each unit or mat section 15 is adapted to have on the top or exposed face thereof suitable advertisement such as the trade name of the brewery or other indicia germane to the business or the contents of the crate.

In connection with the above it may be stated that it is desired to have the units 15 correspond in dimension and to be preferably square, hence the provision of the space 14, otherwise in actual practice it might be found that the units 15 would be oblong and would not accordingly be as attractive for use as mats.

It will be further noted that in the form of the invention shown in Figure 2 the mat units 15 have squared corners. It is sometimes desirable to add to the attractiveness and appearance of these mats by rounding the corners thereof and where such mats are desired the lid of the invention, as shown in Figure 3 is scored on longitudinal lines 17a and transverse lines 16a connected at the corners of the areas 15a defining the mats by arcuate score lines 18. By removing the units along the score lines 16a, 17a, and 18 the unit separate and apart from the lid will be substantially of the same shape as the unit 15 with the exception that the corners thereof will be rounded.

The lid, as a lid is used in substantially the ordinary manner, the main body portion of the lid fitting within the top of the crate 5 and resting on the caps of the bottles 7 as shown in Figure 1. The flaps or wings 12 at the ends of the lid, in the insertion of the lid are folded inwardly at right angles to the body of the lid to extend downwardly along the inner faces of the end walls of the crate and across the hand holes 6 for substantially closing these holes in a manner to exclude light from the interior of the crate.

When the contents of the crate are to be used the lid 9 is removed and then the units or sections 15 removed in a manner thought apparent and hereinbefore described for use as individual mats to be placed on the table and to have rested thereon the bottles or the tumblers or glasses as the case may be.

From the above it will be seen that I have provided a lid for beer cases which serves the dual function of a lid and a beer mat and which further, can be so divided into the individual mat forming unit as to provide a mat for each bottle contained in the crate.

Having thus described my invention, what I claim as new is:

As a new article of manufacture, a flat, elongated, relatively thick and rigid sheet of beer mat stock providing a beer case cover having a pair of end flaps foldable downwardly to cover the hand holes of a beer case, and also having a plurality of individual coaster mats between said flaps, and partially severed from the sheet by cuts extending inwardly from one face only of the sheet so that normally the sheet remains intact, but the mats may be readily, either singly or in groups, optionally, detached from the sheet by tearing along the cuts, said sheet presenting a smooth, unbroken and uncut surface on the face thereof opposite to the cuts.

EDGAR RUSSELL STEIN.